(12) United States Patent
Sandberg et al.

(10) Patent No.: US 8,505,482 B2
(45) Date of Patent: Aug. 13, 2013

(54) METHOD AND ARRANGEMENT FOR CONTROLLING THE MILKING BY A MILKING MACHINE

(75) Inventors: Ola Sandberg, Gnesta (SE); Eva Pia Sandstedt, legal representative, Gnesta (SE); Torbjorn Petterson, Gnesta (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 13/462,282

(22) Filed: May 2, 2012

(65) Prior Publication Data

US 2012/0210939 A1   Aug. 23, 2012

Related U.S. Application Data

(62) Division of application No. 12/863,996, filed as application No. PCT/SE2009/050044 on Jan. 16, 2009.

(30) Foreign Application Priority Data

Jan. 24, 2008  (SE) ...................................... 0800173

(51) Int. Cl.
  *A01J 3/00* (2006.01)
(52) U.S. Cl.
  USPC .................................... 119/14.02; 119/14.08
(58) Field of Classification Search
  USPC .......... 119/14.01, 14.02, 14.07, 14.08, 14.14, 119/14.15, 14.2, 14.25, 14.3, 14.4, 14.41, 119/14.43, 14.55
  See application file for complete search history.

(56) References Cited

U.S. PATENT DOCUMENTS

| | | | |
|---|---|---|---|
| 3,754,532 A * | 8/1973 | Troberg et al. | 119/14.08 |
| 4,011,838 A | 3/1977 | Nordegren et al. | |
| 4,190,021 A | 2/1980 | Reisgies | |
| 4,263,875 A | 4/1981 | Maier et al. | |
| 4,292,926 A * | 10/1981 | Tilman | 119/14.02 |
| 4,452,177 A | 6/1984 | Plett | |
| 4,483,272 A | 11/1984 | Tonelli | |

(Continued)

FOREIGN PATENT DOCUMENTS

| | | |
|---|---|---|
| DE | 25 23 465 A1 | 12/1976 |
| DE | 34 19 615 A1 | 11/1985 |

(Continued)

OTHER PUBLICATIONS

New Zealand Examination Report dated Jul. 6, 2012, from corresponding NZ Patent Application No. 586308.
New Zealand Examination Report dated Jul. 6, 2012, from corresponding NZ Patent Application No. 600965.

(Continued)

*Primary Examiner* — Kimberly Berona
*Assistant Examiner* — Joshua Huson
(74) *Attorney, Agent, or Firm* — Young & Thompson

(57) ABSTRACT

A method for controlling the milking by a milking machine includes, during an initial phase of the milking, increasing a milking vacuum and/or a maximum pulsation vacuum for the milking gradually from a first selected vacuum level (1L) towards a second selected vacuum level (2L) to thereby improve teat stimulation and decreasing the risk of a second milk letdown. When a second milk letdown (2ML) is detected, the maximum pulsation vacuum is preferably immediately lowered to a third selected vacuum level (3L), and is kept at that third selected vacuum level until a certain milk flow has been established, whereupon the pulsation vacuum level is then again increased gradually until the second selected vacuum level is reached.

25 Claims, 4 Drawing Sheets

(56) References Cited

U.S. PATENT DOCUMENTS

| | | | |
|---|---|---|---|
| 4,846,108 A | | 7/1989 | Meermoller |
| 5,218,924 A | * | 6/1993 | Thompson et al. ......... 119/14.02 |
| 5,704,311 A | * | 1/1998 | van den Berg ............. 119/14.02 |
| 5,769,024 A | * | 6/1998 | Ornerfors et al. .......... 119/14.02 |
| 5,970,910 A | * | 10/1999 | Grimm et al. .............. 119/14.02 |
| 5,979,358 A | * | 11/1999 | Ornerfors et al. .......... 119/14.02 |
| 5,992,347 A | * | 11/1999 | Innings et al. ............. 119/14.07 |
| 6,164,242 A | * | 12/2000 | Olofsson .................... 119/14.02 |
| 6,510,812 B1 | * | 1/2003 | Petterson et al. .......... 119/14.02 |
| 7,607,404 B2 | * | 10/2009 | Stellnert et al. ........... 119/14.08 |
| 2003/0226512 A1 | * | 12/2003 | van den Berg ............ 119/14.43 |
| 2005/0056224 A1 | * | 3/2005 | Van Den Berg et al. ... 119/14.02 |
| 2007/0157887 A1 | | 7/2007 | Fernandez |
| 2009/0199769 A1 | * | 8/2009 | Tucker et al. .............. 119/14.02 |

FOREIGN PATENT DOCUMENTS

| | | |
|---|---|---|
| DE | 36 24 478 A1 | 1/1988 |
| EP | 0 017 493 A1 | 10/1980 |
| EP | 1 312 256 A2 | 5/2003 |
| GB | 1 248 648 A | 10/1971 |
| GB | 1 592 408 A | 7/1981 |
| NZ | 203452 A | 6/1986 |
| NZ | 205360 A | 3/1987 |
| WO | 01/19169 A1 | 3/2001 |
| WO | 02/19804 A1 | 3/2002 |
| WO | 2006068581 A1 | 6/2006 |
| WO | 2007089185 A1 | 8/2007 |

OTHER PUBLICATIONS

International Search Report, dated Nov. 23, 2009, from corresponding PCT application.

* cited by examiner

METHOD AND ARRANGEMENT FOR
CONTROLLING THE MILKING BY A
MILKING MACHINE

CROSS REFERENCE TO RELATED
APPLICATIONS

This application is a division of copending application Ser. No. 12/863,996 filed on Jul. 22, 2010; which is the 35 U.S.C. 371 national stage of International application PCT/SE09/50044 filed on Jan. 16, 2009; which claims priority to Swedish application 0800173-7 filed on Jan. 24, 2008. The entire contents of each of the above-identified applications are hereby incorporated by reference.

TECHNICAL FIELD OF THE INVENTION

The present invention relates generally to dairy farming and to milking of dairy animals therein. Particularly, the invention relates to a method and an arrangement for controlling the milking by a milking machine.

DESCRIPTION OF RELATED ART AND
BACKGROUND OF THE INVENTION

In modern dairy farm industry there are continuous research and development activities in order to improve the efficiency of various activities such as machine milking, which, inter alia, involves increased milk yield and reduced milking time, while, naturally, ethical aspects as well as animal care are considered.

Machine milking, as known in the art, generally utilizes teat cups and vacuum sources to perform the milking function. In such systems each teat is contained within a teat cup having a teat receiving liner, inside the teat cup next to the teat. A working vacuum is applied to the interior of each teat cup liner to draw the milk from the teat, with the teat liners periodically opened and collapsed by applications of a pulsating massage vacuum between the liner and the inside of the cup. This periodic working of the teat liners results in the periodic flow of milk from each teat into a receiving vessel, and constitutes the actual milking of the cow.

Milking preparation involves the first phases of milking in which the teat is stimulated in order to stimulate the milk ejection reflex and induce milk letdown.

GB 1 248 648 discloses a milking machine with a flow rate sensing device in a pipeline between the teat cup liners of the rear cups and a milk receiver held under partial vacuum such that the device operates a control means for varying the degree of vacuum between a working high vacuum and an idling low vacuum. Vacuum lines having different pressures (250 mms Hg and 550 mms Hg as given) are connected through hose pincher means to the milk receiver and through pulsators of differing frequency to the teat cups. When no milk flows through the device, the control valve, having one connection to vacuum and another to the atmosphere, causes pistons to operate the pincher means such that the milk receiver and teat cup liners are connected to the lower vacuum 550 mms Hg and the pulsator of lower frequency is connected to the teat cups, while during a flow of milk, impulses from the milk sensing device transmitted pneumatically to the control valve cause the pistons to move to change the positions of pincher means thereby connecting the higher vacuum to the milk receiver and the faster pulsator to the teat cups.

SUMMARY OF THE INVENTION

The milking machine of GB 1 248 648 operates only with two different vacuum levels (250 mms Hg and 550 mms Hg) and the vacuum used at each instant depends on the milk flow. Hereby, a continuous operation may be obtained wherein the vacuum is changed stepwise between the two vacuum levels.

For some animals the milking preparation that is typically performed may not be sufficient to establish a high milk flow. For instance, some animals have a tendency of so-called second milk letdown, i.e. a drop in the milk flow rate when the cistern milk has been milked out and before the milk from the alveoli is let down. This leads inevitably to creeping of teat cups up on the teats of the milking animal and prolongs the milking time. It may also be unpleasant, or even harmful, to the milking animal.

It is therefore an object of the present invention to provide a method and an arrangement, respectively, for controlling the milking by a milking machine, by which method and arrangement the milking production can be increased and the animal care can be improved.

It is in this respect a particular object of the invention to provide such a method and such an arrangement, by which stimulation of the milk ejection reflex is improved and by which the occurrence of second milk letdowns is reduced.

It is a further object of the invention to provide such a method and such an arrangement, which are accurate, efficient, reliable, of low cost, and easy to implement.

These objects, among others, are attained by the methods, the computer program product, and the arrangement as defined in the appended patent claims.

According to a first aspect of the invention there is provided a method for controlling the milking by a milking machine comprising the step of: (i) during an initial phase, i.e. a milk flow increasing or stimulating phase, of the milking, increasing a milking vacuum and/or a maximum pulsation vacuum for the milking gradually from a first selected vacuum level towards a second selected vacuum level, to thereby improve teat stimulation and decrease the risk of a second milk letdown.

The gradual increase follows preferably a ramp function and lasts preferably for at least 10 seconds, and more preferably for at least 30 seconds. Typically, the gradual increase lasts not longer than about 90 seconds. Thus, the increase lasts for a considerable time giving the animal time to be stimulated and the milk letdown can be induced prior to reaching high vacuum levels. The risk of obtaining a second milk letdown is hereby reduced.

The milking vacuum and/or a maximum pulsation vacuum are thus initially increased gradually independently of the level of the milk flow.

If, however, a second milk letdown is detected, the maximum pulsation vacuum is preferably immediately lowered to a third selected vacuum level (which is lower than the milking vacuum), is kept at that vacuum level until a certain milk flow has been established, and is then again increased gradually until the second selected vacuum level is reached. Hereby, creeping of teat cups up on the teats of the animal is avoided and the milk from the alveoli is let down faster.

By means of the present invention the overall milk production can be optimized. The milk production can be maximized, while the animal care is maintained or even improved. Each milking animal is better stimulated in a stimulating phase of the milking, to induce milk letdown.

The invention differs considerably from GB 1 248 648 in that the milking vacuum and/or the maximum pulsation vacuum is increased gradually during an initial phase of the milking independently of the milk flow, whereas the vacuum of the milking machine disclosed in GB 1 248 648 is changed stepwise between two fixed levels depending on a sensed milk flow.

According to a second aspect of the invention there is provided an arrangement for implementing the above method. The arrangement comprises a vacuum control device provided for increasing the milking vacuum and/or a maximum pulsation vacuum gradually. The arrangement comprises preferably further a milk flow meter to measure the flow of milk produced during the milking and a timer or other time measuring device, by which the phases of the milking can be monitored.

Further characteristics of the invention and advantages thereof, will be evident from the detailed description of preferred embodiments of the present invention given hereinafter and the accompanying FIGS. 1-4, which are given by way of illustration only and thus, are not limitative of the present invention.

DETAILED DESCRIPTION OF EMBODIMENTS

Figure 1:
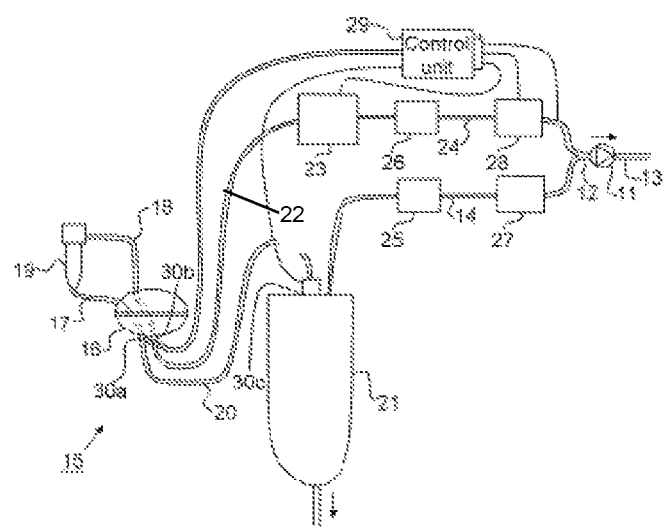
FIG. 1 illustrates schematically main components of a milking machine, wherein an embodiment of the present invention is implemented.

Main parts of a milking machine, which implements an embodiment of the invention, are disclosed in FIG. 1. A vacuum pump 11 has a suction side 12 and a pressure side 13, wherein the suction side 12 of the vacuum pump 11 is via a vacuum conduit 14 connected to a milking device 15.

The milking device 15 comprises a milking claw 16, which, via a milk tube 17 and a pulse tube 18, is connected to a teat cup 19 provided to be attached to a teat of an animal, such as a cow, to be milked. Of course, the milking device 15 may comprise more than one milking claw and each milking claw may be connected to more than one teat cup. In case the animals are cows four teat cups are needed for the milking of each animal.

The milking device 15 further comprises a receiving vessel 21, which is connected to the milking claw 16 via a further milk tube 20. The receiving vessel 21, which is connected to the vacuum conduit 14, may be provided with a separator for intermittently removing separated liquid and for preventing that liquid is introduced in the vacuum conduit 14.

Furthermore, a pulsator 23 is connected to the milking claw 16 via a pulse tube 22. The pulsator 23 may be connected, as illustrated, to the vacuum pump 11 via a further vacuum conduit 24 in order to be capable of controlling the pulsation and milking vacuum levels independently of each other.

The vacuum pump 11 sucks a flow of air from the milking device 15 via the vacuum conduits 14 and 24. Hereby, a milking vacuum is produced in the teat cup 19 via the vacuum conduit 14, the receiving vessel 21, and the milk tubes 20 and 17. Similarly, a pulsating vacuum is produced in the annular space between a teat receiving liner and a teat cup shell of the teat cup 19 via the further vacuum conduit 24, the pulsator 23, and the pulse tubes 22 and 18. The pulsating vacuum varies during a pulsation cycle, for instance between atmospheric pressure and a maximum pulsation vacuum and causes the teat receiving liner 33 to periodically open and collapse to thereby massage the teat and stimulate milk ejection. By means of the applied milking and pulsation vacuums, milk is drawn from the teat of an animal to the receiving vessel 21.

In order to regulate the milking vacuum such that a preset level is maintained, and to regulate the pulsation vacuum such that the maximum pulsation vacuum in each pulsation cycle amounts to a preset level a first respective vacuum regulator 25, 26 is provided in the respective vacuum conduit 14, 24.

Each of the regulators 25, 26 may be any regulator known in the art, but is preferably a cost-efficient and reliable mechanic vacuum regulator. For instance, the vacuum regulators 25, 26 may each be comprised of a vacuum regulator of membrane type as being disclosed in detail in WO 02/19804 or in EP0017493, the contents of which being hereby incorporated by reference.

If no or very small pressure gradients occur in the milking machine the vacuum regulator 25, 26 may be dispended with.

Further, a second respective vacuum regulator or vacuum control device is provided in the respective vacuum conduit 14, 24 between the first respective vacuum regulator 25, 26 and the vacuum pump 11 in order to control, at each instant, the milking and maximum pulsation vacuums independently of each other. Each of the vacuum regulators is preferably formed by a valve arrangement 27, 28, a pressure sensor 30a, 30b located in the milking equipment 15, a common control unit 29, and signal connections interconnecting the valve arrangement 27, 28 with the common control unit 29 and the pressure sensor 30a, 30b with the common control unit 29. If so desired, a separate control unit may be provided for each vacuum regulator.

The milking and maximum pulsation vacuums are controlled by the control unit 29, and the pressure sensors 30a, 30b, which are arranged for repeatedly measuring the milking vacuum and the pulsation vacuum in the milking device 15 and for forwarding the measured pressure levels to the control unit 29, provides a feedback loop for the vacuum control.

It shall be appreciated that the vacuum regulators of the invention may be used for the control of the milking vacuum in more teat cups than one, such as in four teat cups, for the milking of an animal.

Alternatively, each of a plurality of teat cups is connected individually to a vacuum source via a respective milk tube, a respective receiving vessel, a respective vacuum conduit, optionally a respective first vacuum regulator, and a respective second vacuum regulator or control arrangement. Hereby, the preset milking and maximum pulsation vacuums may be controlled individually for each teat that is milked.

A milking machine of the above kind is disclosed in our co-pending Swedish patent application No. 0600199-4, the contents of which being hereby incorporated by reference.

Still alternatively, each of a plurality of teat cups is connected individually to a common receiving vessel by a respective milk line, which in turn is connected to a vacuum source. Each of the milk lines (or tea cups) is provided with a separately controllable regulator or valve means. Hereby, the preset milking and maximum pulsation vacuums may be controlled individually for each teat that is milked.

It shall be appreciated that the present invention may be implemented in any other kind of milking apparatus that provides individual control of the milking and maximum pulsation vacuums during milking. For instance, as an alternative to the valve arrangement 27, 28, the frequency controlled or other vacuum pumps may be provided for creating varying vacuum levels as desired.

According to this embodiment of the present invention the second vacuum regulator or vacuum control device arranged in the vacuum conduit 14 is, during a milk stimulating phase of a milking, provided for increasing a milking vacuum and/or a maximum pulsation vacuum for the milking monotonously and non-momentary from a first selected vacuum level towards at least a second selected vacuum level. The milking vacuum and/or a maximum pulsation vacuum are thus initially increased gradually independently of the level of the milk flow.

The gradual increase follows preferably a ramp function and lasts preferably for at least 10 seconds, and more preferably for at least 30 seconds. Typically, the gradual increase lasts not longer than about 90 seconds. Thus, the increase lasts for a considerable time giving the animal time to be stimulated and the milk letdown can be induced prior to reaching high vacuum levels. The risk of obtaining a second milk letdown is hereby reduced.

The gradual increase may be performed at a rate of between about 3 kPa/min and about 30 kPa/min, preferably between 5 kPa/min and 20 kPa/min, and most preferably at about 10 kPa/min.

The milk stimulating phase may be monitored by a timer or other time measuring device, which may be provided, e.g. as an integral function of the control unit 29.

FIG. 2 Embodiment

A method for controlling the milking of an animal according to an embodiment of the invention will next be described with reference to FIG. 2, which is a diagram of the milking vacuum and the maximum pulsation vacuum as functions of time in different phases of milking. The milk flow as a function of milking time is also indicated. The method is preferably implemented by a milking machine such as the one of FIG. 1.

Maximum Pulsation Vacuum

During an initial phase, i.e. a stimulating phase, of the milking, the maximum pulsation vacuum for the milking is increased monotonously and non-momentary from a first selected vacuum level 1L towards a second selected vacuum level 2L.

Preferably, the maximum pulsation vacuum is increased monotonously and non-momentary during the stimulating phase at a first speed during a first part 1P of the increase and at a second speed during a following part 2P of the increase, the second speed being higher than the first speed. This is indicated in FIG. 2 by a steeper slope of the maximum pulsation vacuum curve in the following part 2P of the increase as compared to the first part 1P thereof.

The maximum pulsation vacuum may first be increased at a first constant speed and then, when a milk flow rate as measured during the milking exceeds a first selected threshold value 1TH, preferably about 0.2-0.5 l/min, the maximum pulsation vacuum may be increased at a second constant speed, which is higher than the first constant speed.

The first selected vacuum level 1L is advantageously between about 25 and 35 kPa, and most advantageously about 30 kPa. The second selected vacuum level 2L is advantageously between about 45 and 55 kPa, and most advantageously about 50 kPa.

If a second milk letdown 2ML is detected during the milking, the maximum pulsation vacuum is immediately lowered to a third selected vacuum level 3L, which may be between about 25 and 40 kPa, and preferably about 35 kPa, i.e. a level lower than the vacuum level of the milking vacuum. The second milk letdown 2ML may be defined as e.g. when a milk flow rate as measured during the milking by a milk flow meter or other milk quantity measuring device 30c, which is provided, e.g. at the inlet to the receiving vessel 21, to measure the flow or instantaneous quantity of milk produced during the milking, falls below a second selected threshold 2TH, which may be given as a percentage drop, e.g. about 20%, of a maximum milk flow rate measured during a previous part of the milking.

The milking flow is kept at the third selected vacuum level 3L after having been lowered thereto and until a milk flow rate as measured during the milking exceeds a third selected threshold 3TH, which may be identical with the maximum milk flow rate measured during the previous part of the milking. The maximum pulsation vacuum, after having been kept at the third selected vacuum level 3L, is at this point again increased monotonously and non-momentary towards the second selected vacuum level 2L.

Then, the maximum pulsation vacuum is kept at the second selected vacuum level 2L during a main milking phase of the milking and the maximum pulsation vacuum is lowered to a fourth selected vacuum level 4L when the milk flow rate as measured during the milking falls below a fourth selected threshold 4TH. The fourth selected vacuum level 4L may advantageously be identical with the third selected vacuum level 3L, and the fourth selected threshold 4TH may be given as a percentage drop, e.g. about 20%, of a maximum measured milk flow rate during the main milking phase of the milking.

The maximum pulsation vacuum may, if desired, be lowered to a fifth selected vacuum level 5L when the milk flow rate as measured during the milking falls below a fifth selected threshold 5TH. Here, the fifth selected threshold 5TH is preferably close to, or somewhat higher than, the first selected threshold 1TH and the fifth selected vacuum level 5L is preferably identical with the first selected vacuum level M.

Milking Vacuum

The milking vacuum for the milking is increased monotonously and non-momentary together with the maximum pulsation vacuum from the first selected vacuum level 1L until a sixth selected vacuum level 6L, which preferably is between about 35 and 50 kPa, and most preferably about 44 kPa, is reached. The milking vacuum is kept at this vacuum level during the main milking phase of the milking and is lowered to a seventh selected vacuum level 7L when the milk flow rate as measured during the milking falls below a sixth selected threshold 6TH.

The seventh selected vacuum level 7L is advantageously identical with the fifth selected vacuum level 5L and the sixth selected threshold 6TH is advantageously identical with the fifth selected threshold 5TH.

Note specifically that if a second milk letdown 2ML is detected during the milking, the milking vacuum is kept unchanged in response to this detection in contrast to the maximum pulsation vacuum.

Figure 2:
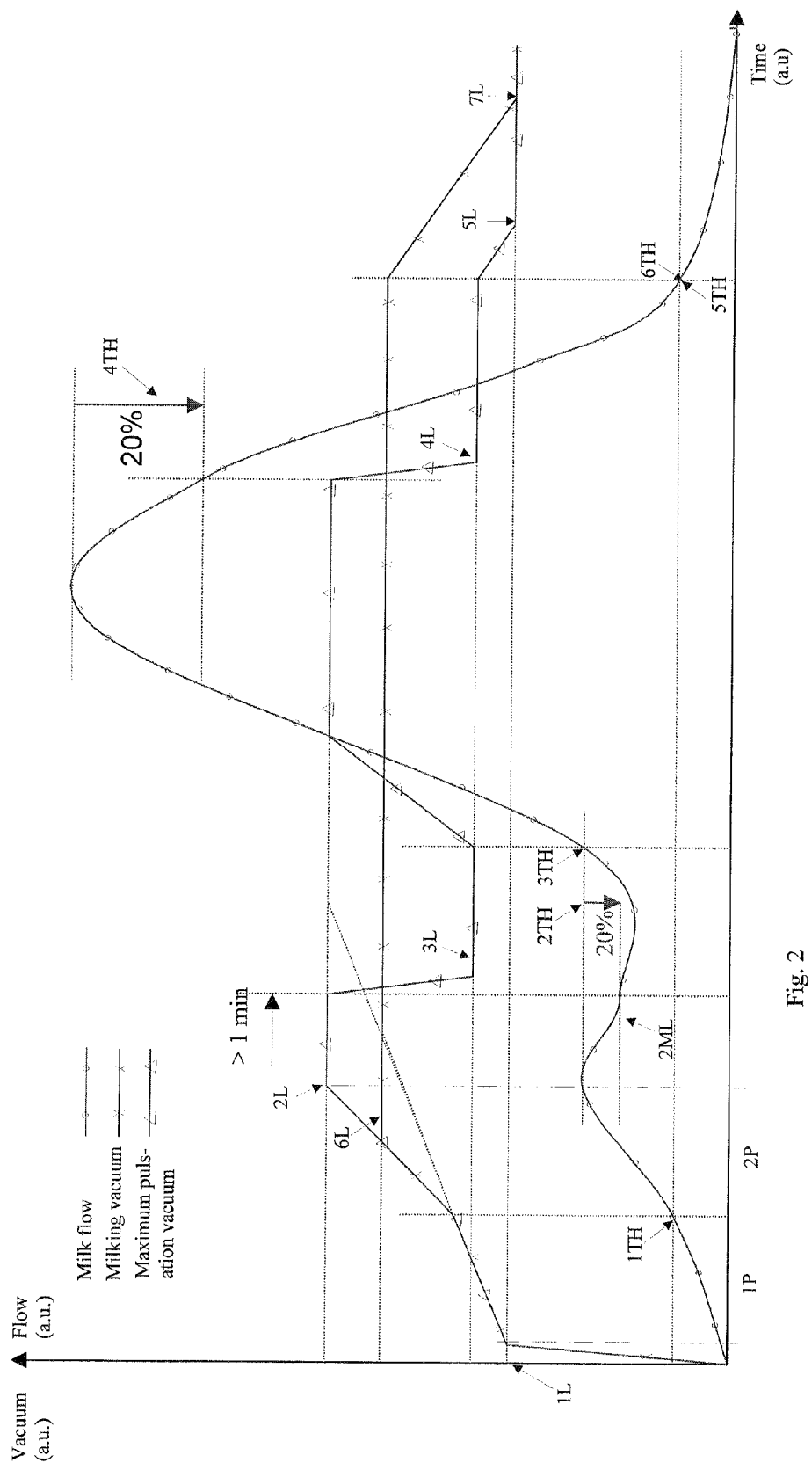
FIG. 2 is a diagram of the milking vacuum and the maximum pulsation vacuum as functions of time in different phases of milking according to a further embodiment of the invention. The milk flow as a function of milking time is also indicated.

The method according to the FIG. 2 embodiment of the invention provides for an efficient milking, at the same time as the milked animal is well treated. The main milking can be started earlier since the teat stimulation is improved, and the milking can be made faster since the risk of undesired second milk letdowns is decreased.

It shall be appreciated that the above figures are exemplary figures for a low line milking system. Should the milking system be a high line milking system or any other kind of milking system the figures may have to be altered accordingly.

Figure 3:
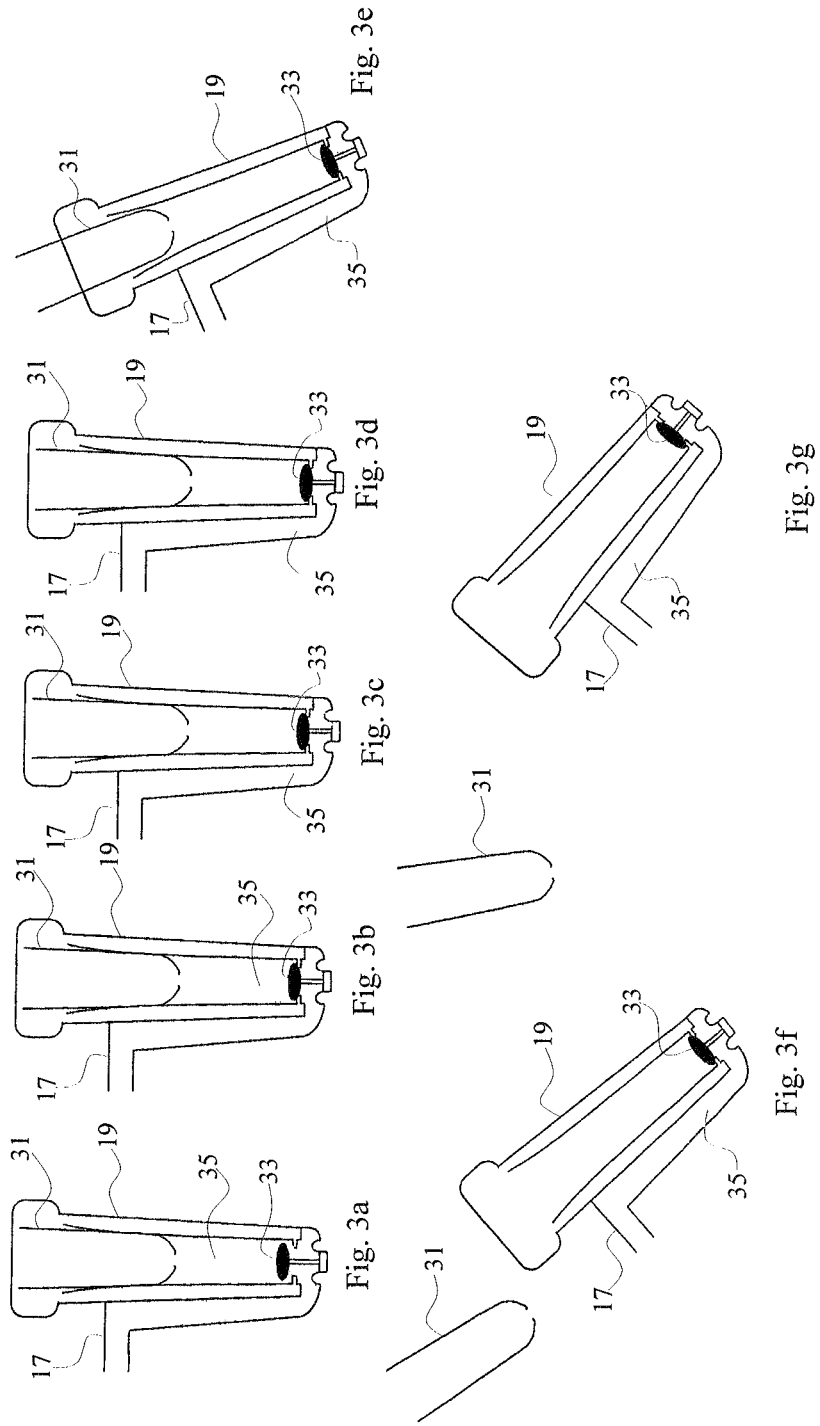
FIGS. 3a-g illustrate a teat cup and a teat during a terminating phase of milking according to a yet further embodiment of the invention.
Figure 4:
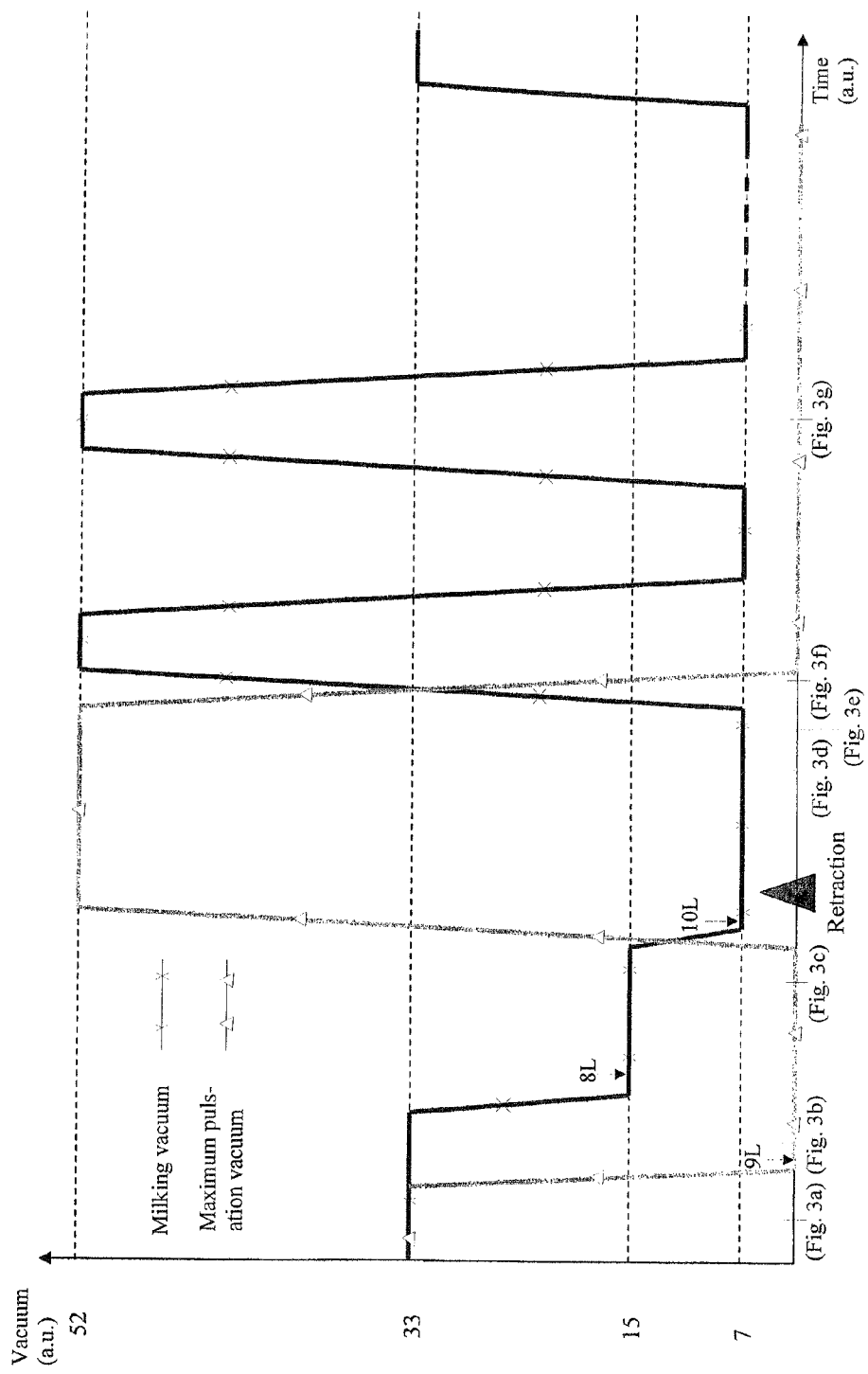
FIG. 4 is a diagram of the milking vacuum and the maximum pulsation vacuum as functions of time during the terminating phase as being illustrated in FIGS. 3a-g.

FIGS. 3-4 Embodiment

A method for controlling the vacuum levels during a terminating phase of a milking according to a further embodiment of the invention will next be described with reference to FIGS. 3*a-g* and 4. FIGS. 3*a-g* illustrate a teat cup 19 and a teat 31 during different stages of the terminating phase and FIG. 4 is a diagram of the milking vacuum and the maximum pulsation vacuum as functions of time during the terminating phase. The stages of the terminating phase, at which the teat cup 19 and the teat 31 are shown in FIGS. 3*a-g*, are indicated in FIG. 4 by referring to the FIGS. 3*a-g* at different positions along the time axis. The method is preferably implemented by a milking machine such as the one of FIG. 1.

The method has specifically been developed for a teat cup 19 having a valve 33 interconnected in the bottom thereof. The valve operates in the following manner: when the valve is at rest, i.e. when atmospheric pressures prevail in the teat cup and in the milk tube connected to the teat cup, the valve is closed and rests against the seat of the valve. When the milk hose is connected to vacuum and no teat is received in the teat cup, the valve is closed by a certain force. When a teat is entered into the teat cup and is sealed against the inner walls of the teat cup, the vacuum in the teat cup will increase, and at a certain vacuum level the valve will open.

During a terminating phase of the milking, the milking and maximum pulsation vacuums are kept at e.g. about 30 or 33 kPa such as at the first or third selected vacuum level of FIG. 2. The terminating phase may e.g. start at the right hand side of FIG. 2. The teat 31 is received by the teat cup 19 as being shown in FIG. 3*a* and a low flow of milk 35 is still obtained.

Next, the milking vacuum for the milking is lowered to an eighth vacuum level 8L, which is preferably between about 10 and 20 kPa, and most preferably about 15 kPa, and the maximum pulsation vacuum for the milking is lowered to a ninth vacuum level 9L, which is preferably about 0 kPa, in order to terminate the milking. These operations may be performed simultaneously, or one after the other as being indicated in FIG. 4. The resulting milking process is shown in FIG. 3*b*. The actual milking has been terminated, and the last amounts of milk 35 are drawn from the teat cup 19, through the valve 33 and into the milk tube 17. FIG. 3*c* shows a stage, wherein the teat cup 19 has been emptied from the last amounts of milk 35.

The milking vacuum is at this stage lowered to a tenth vacuum level 10L, which is preferably between about 4 and 10 kPa, and most preferably about 7 kPa, in order to prevent milk as milked from flowing backwards, i.e. back into the teat cup, and the maximum pulsation vacuum is increased, preferably to the second vacuum level 2L, to expand the teat receiving liner of the teat cup 19 to thereby facilitate take off of the teat cup 19. FIG. 3*d* illustrates the teat cup 19 and the teat 31 at this stage, whereas FIG. 3*e* illustrates the teat cup 19 and the teat 31 when the take-off of the teat cup 19 is about half-way through.

When the take-off is completed, the maximum pulsation vacuum for the milking is lowered again, preferably to about 0 kPa, and the milking vacuum is, one or two times (as illustrated), first increased, preferably to the second vacuum level 2L, and then lowered, to thereby removing residue milk from the teat cup 19 and the milk tube 17. FIGS. 3*f* and 3*g* illustrate the teat cup 19 and the teat 31 at the beginning of, and at a latter part, respectively, of this stage. The two increases of the milking vacuum should preferably be made with the teat cup 19 in different orientations in order to ensure that all residue milk is efficiently removed.

The above described method provides for a terminating phase of the milking and a take-off sequence that is fast, accurate, efficient, reliable, of low cost, and easy to implement. The milk is prevented from flowing backwards into the teat cup, the take-off is simplified, and the milk is removed efficiently from the teat cup.

If so desired, the methods and arrangements of the present invention can be implemented separately for each teat of the animal.

It shall be appreciated that the milking machine in which the present invention can be used encompasses those served by robots, those that are semi-automated, as well as those that are manually operated.

The invention claimed is:

1. A method for controlling milking by a milking machine, comprising the steps of:
   monitoring a milk flow rate of milk provided by a milking animal by a milk flow measuring device; and
   during an initial stimulation phase of milking in which a teat of the milking animal is stimulated to cause the milk to initially flow from the teat of the milking animal, increasing a milking vacuum for said milking gradually from a first selected milking vacuum level (1L) to a second selected milking vacuum level (6L) by controlling a vacuum pump connected to a milking device that is connected to the milking animal to improve teat stimulation and decrease the risk of a second milk letdown after a first milk letdown, the vacuum pump controlling a flow of air from the milking device via a first vacuum conduit to increase the milking vacuum,
   wherein the milking vacuum is increased gradually during the initial stimulation phase at a first vacuum level rate of change during a first part (1P) of said increase and at a second vacuum level rate of change during a following second part (2P) by the vacuum pump, changing from said first vacuum level rate of change to said second vacuum level rate of change when the milk flow rate exceeds a first selected threshold value (1TH), the changing being a function of the monitored milk flow rate monitored by the milk flow measuring device, said second vacuum level rate of change being higher than said first vacuum level rate of change.

2. The method of claim 1, comprising the further step of, during the initial stimulation phase of said milking, increasing a maximum pulsation vacuum for said milking gradually from a first selected maximum pulsation vacuum level (1L) to a second selected maximum pulsation vacuum level (2L) by controlling the vacuum pump connected to a pulsator that is connected to at least a portion of the milking device so that the maximum pulsation vacuum for said milking is increased gradually together with the milking vacuum from the first selected maximum pulsation vacuum level, the vacuum pump controlling the flow of air via a second vacuum conduit to which the pulsator is connected to increase the maximum pulsation vacuum, the first selected milking vacuum level and the first selected maximum pulsation vacuum level being equal to each other.

3. The method of claim 2, wherein,
   the first selected maximum pulsation vacuum level is between about 25 and 35 kPa, and
   the second selected maximum pulsation vacuum level is between about 45 and 55 kPa.

4. The method of claim 2, comprising the further steps of:
   from the monitored milk flow rate, detecting a second milk letdown; and
   when the second milk letdown is detected, lowering the maximum pulsation vacuum to a third selected maximum pulsation vacuum level (3L), the third maximum pulsation selected vacuum level (3L) being lower than the second maximum pulsation selected vacuum level (2L) and lower than the second selected milking vacuum level (6L).

5. The method of claim 2, wherein the first vacuum level rate of change and the second vacuum level rate of change each being increased at a constant rate.

6. The method of claim 5, comprising the further steps of:
from the monitored milk flow rate, detecting a fall in the milk flow rate below a second selected threshold (2TH); and
when the fall in the milk flow rate below the second selected threshold (2TH) is detected, lowering the maximum pulsation vacuum to a third selected maximum pulsation vacuum level (3L), the third selected maximum pulsation vacuum level (3L) being lower than the second selected maximum pulsation vacuum level (2L) and lower than the second selected milking vacuum level (6L).

7. The method of claim 6, wherein said second selected threshold is a percentage drop of about 20% of a first maximum milk flow rate measured after the milk flow rate initially begins to increase.

8. The method of claim 6, wherein the third selected maximum pulsation vacuum level is between about 25 and 40 kPa.

9. The method of claim 7, comprising the further step of:
maintaining the maximum pulsation vacuum at the third selected maximum pulsation vacuum level (3L) after having been lowered thereto until the monitored milk flow rate exceeds a third selected threshold (3TH).

10. The method of claim 9, wherein the third selected threshold is identical to the maximum milk flow rate.

11. The method of claim 9, wherein the maximum pulsation vacuum, after having been kept at the third selected maximum pulsation vacuum level (3L), is again increased gradually until the second selected maximum pulsation vacuum level (2L) is reached.

12. The method of claim 9, wherein the maximum pulsation vacuum is kept at the second selected maximum pulsation vacuum level during a main milking phase of milking following the initial stimulation phase of milking and the maximum pulsation vacuum is lowered to a fourth selected maximum pulsation vacuum level (4L) when the milk flow rate as measured during the main milking phase of milking by the milk flow measuring device falls below a fourth selected threshold (4TH).

13. The method of claim 12, wherein the fourth selected maximum pulsation vacuum level (4L) is identical to the third selected maximum pulsation vacuum level (3L).

14. The method of claim 12, wherein the fourth selected threshold is a percentage drop of about 20% of a second maximum milk flow rate measured during the main milking phase of milking.

15. The method of claim 12, wherein the maximum pulsation vacuum is lowered to a fifth selected maximum pulsation vacuum level (5L) when the milk flow rate during said milking during the main milking phase falls below a fifth selected threshold (5TH).

16. The method of claim 15, wherein the fifth selected threshold is identical to the first selected threshold, and the fifth selected maximum pulsation vacuum level (5L) is identical to the first selected maximum pulsation vacuum level (1L).

17. The method of claim 15, wherein
the milking vacuum is kept at the second selected milking vacuum level (6L) during a main milking phase of milking and is lowered to a third selected milking vacuum level (7L) when the milk flow rate as measured during the main milking phase falls below a sixth selected threshold (6TH).

18. The method of claim 17, wherein,
the second selected milking vacuum level (6L) is between about 35 and 50 kPa,
the third selected milking vacuum level (7L) is between about 25 and 35 kPa, and
the sixth selected threshold is 0.3-0.7 l/min.

19. The method of claim 17, wherein during a terminating phase of milking after the main milking phase of milking, the milking vacuum is lowered to a fourth milking vacuum level (8L), which is between about 10 and 20 kPa.

20. The method of claim 19, wherein during the terminating phase of said milking, the maximum pulsation vacuum is lowered to a sixth maximum pulsation vacuum level (9L), which is about 0 kPa, in order to terminate the milking.

21. The method of claim 20, wherein the milking vacuum is lowered to a fifth milking vacuum level (10L), which is between about 4 and 10 kPa, in order to prevent milk from flowing backwards from the teat cup, and the maximum pulsation vacuum is increased to facilitate teat cup (19) take-off.

22. The method of claim 21, wherein the milking vacuum is first increased and then lowered one or two times, during the terminating phase of milking, to thereby remove residue milk from teat cups (19) and milk tubes (17) connected thereto.

23. The method of claim 1, wherein,
the gradual increase during the initial stimulation phase follows a ramp function and lasts for at least 10 seconds,
the gradual increase is performed at a rate of between about 3 kPa/min and about 30 kPa/min, and
the first selected threshold value (1TH) is about 0.2-0.5 l/min.

24. The method of claim 1, wherein, when a second milk letdown (2ML) is detected during milking after the first milk letdown, the milking vacuum is kept unchanged in response to said detection.

25. A method for controlling milking by a milking machine, comprising the steps of:
monitoring a milk flow rate of milk provided by a milking animal by a milk flow measuring device; and
during an initial stimulation phase of milking in which a teat of the milking animal is stimulated to cause the milk to initially flow from the teat of the milking animal, increasing a milking vacuum gradually from a first selected vacuum level (1L) to a second selected vacuum level (6L) by controlling a vacuum pump connected to a milking device that is connected to the milking animal to improve teat stimulation and decrease the risk of a second milk letdown after a first milk letdown, the vacuum pump controlling a flow of air from the milking device via a vacuum conduit to increase the milking vacuum,
wherein the milking vacuum is increased gradually during the initial stimulation phase at a first vacuum level rate of change during a first part (1P) of said increase and at a second vacuum level rate of change during a following second part (2P) by the vacuum pump, the increase from the first vacuum level rate of change to the second vacuum level rate of change occurring when the monitored milk flow exceeds a selected threshold value (1TH), said second vacuum level rate of change being higher than said first vacuum level rate of change.

* * * * *